(12) United States Patent
Yang et al.

(10) Patent No.: US 10,118,457 B2
(45) Date of Patent: Nov. 6, 2018

(54) ANTI-ROLL BAR DEVICE WITH VARIABLE RIGIDITY

(71) Applicant: METAL INDUSTRIES RESEARCH & DEVELOPMENT CENTRE, Kaohsiung (TW)

(72) Inventors: Chun-Pin Yang, Tainan (TW); Chia Pin Lin, Changhua (TW); Wei Lun Hsu, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 61 days.

(21) Appl. No.: 15/292,494

(22) Filed: Oct. 13, 2016

(65) Prior Publication Data

US 2017/0106714 A1    Apr. 20, 2017

(30) Foreign Application Priority Data

Oct. 15, 2015 (TW) .............................. 104133792 A

(51) Int. Cl.
  *B60G 21/055*    (2006.01)

(52) U.S. Cl.
  CPC ....... *B60G 21/0558* (2013.01); *B60G 21/055* (2013.01); *B60G 2200/34* (2013.01); *B60G 2202/135* (2013.01); *B60G 2204/82* (2013.01); *B60G 2206/427* (2013.01); *B60G 2206/73* (2013.01); *B60G 2800/0122* (2013.01)

(58) Field of Classification Search
  CPC .............. B60G 21/055; B60G 21/0551; B60G 21/0553; B60G 21/0555; B60G 21/0556; B60G 21/0558; B60G 2204/82; B60G 2206/427; B60G 2206/73; B60G 2200/34; B60G 2202/135; B60G 2202/22; B60G 2800/012; B60G 2800/0122
  USPC ....... 280/124.106, 124.107, 124.152; 464/51
  See application file for complete search history.

(56) References Cited

U.S. PATENT DOCUMENTS

2015/0151604 A1* 6/2015 Park .......................... F16H 1/28
                                                                    280/124.106

FOREIGN PATENT DOCUMENTS

| DE | 102011077032 A1 * | 12/2012 | ......... B60G 21/0553 |
| DE | 102015209885 A1 * | 12/2016 | ........... B60G 21/055 |
| JP | 2011-31735 A     *  | 2/2011  | ........... B60G 21/055 |

* cited by examiner

*Primary Examiner* — Keith J Frisby
(74) *Attorney, Agent, or Firm* — Birch, Stewart, Kolasch & Birch, LLP

(57) ABSTRACT

An anti-roll bar device with a variable rigidity has a first arm assembly having multiple first joining units, a second arm assembly having multiple second joining units, and a variable rigidity unit mounted between the first arm assembly and the second arm assembly and having multiple abutment portions and a variable rigidity coefficient. The first and second joining units are staggered with each other annularly and abut the abutment portions. When a vehicle passes a bumpy terrain, a slight force is exerted on the variable rigidity unit and is absorbed by the variable rigidity unit, such that the vehicle can be kept from tilting and shaking up and down. When the vehicle is in cornering, a larger force is exerted on the variable rigidity unit to increase a rigidity of the variable rigidity unit, such that the variable rigidity unit can transfer torques to keep the vehicle from tilting.

12 Claims, 9 Drawing Sheets

ANTI-ROLL BAR DEVICE WITH VARIABLE RIGIDITY

BACKGROUND OF THE INVENTION

1. Field of the Invention

The present invention relates to an anti-roll bar device, and more particularly to an anti-roll bar device with a variable rigidity.

2. Description of Related Art

When a vehicle is in cornering, a centrifugal force will lead to a vehicle body of the vehicle to tilt, and the vehicle may be capsized easily, so an anti-roll bar device is mounted between two suspension systems of two wheels, and two ends of the anti-roll bar device are mounted on bottoms of the suspension systems. Multiple fixing units are mounted on the anti-roll bar device and are fixed on the vehicle body, such that the anti-roll bar device can be fixed on the vehicle body.

When the vehicle is in cornering, the vehicle is tilted due to the centrifugal force, and the suspension systems will be forced. The suspension system which is located at an outer side of the vehicle will be compressed, and the other suspension system which is located at an inner side of the vehicle will be extended, so a height difference is formed between the two suspension systems. The suspension systems respectively exert torques on the two ends of the anti-roll bar device, so the anti-roll bar device will generate an upward force for the suspension system which is located at the inner side of the vehicle, and generate a downward force for the suspension system which is located at the outer side of the vehicle to decrease the height difference. Tilting of the vehicle can be avoided so as to decrease risk of capsizing for the vehicle.

However, when the vehicle passes a bumpy terrain, a slight height difference is continuously formed between the two suspension systems because of the bumpy road conditions. If the vehicle does not have the anti-roll bar device, the vehicle body will tilt or shake up and down. If the vehicle has the anti-roll bar device, the anti-roll bar device can keep the vehicle body from tilting, but the vehicle may still shake up and down, causing discomfort of motorists and passengers.

SUMMARY OF THE INVENTION

The main objective of the present invention is to provide an anti-roll bar device with a variable rigidity to resolve the afore-mentioned problems.

The anti-roll bar device with a variable rigidity comprises a first arm assembly, a second arm assembly, a variable rigidity unit, and at least one bearing.

The first arm assembly comprises a first bar and a first joining module. The first bar is bent, and comprises a first connecting portion formed on an end of the first bar. The first joining module is mounted on an end of the first bar at a position opposite the first connecting portion, and comprises a first base and multiple first joining units. The first base comprises a recess recessed in a middle of the first base. The first joining units are mounted on a side of the first base at a position opposite the first bar, and are disposed on a periphery of the recess.

The second arm assembly comprises a second bar and a second joining module. The second bar is curved, and comprises a second connecting portion formed on an end of the second bar. The second joining module is mounted on an end of the second bar at a position opposite the second connecting portion, and comprises a second base and a shaft. The shaft is disposed on a side of the second base at a position opposite the second bar, located at a middle of the second base, corresponds to and is inserted into the recess. The second joining units are mounted on the side of the second base, and are disposed on a periphery of the shaft, and the second joining units and the first joining units are staggered with each other along the periphery of the shaft and the recess.

The variable rigidity unit is mounted between the first arm assembly and the second arm assembly, and comprises a body comprising a through hole formed through a middle of the body. The shaft is inserted through the through hole, wherein the variable rigidity unit has a variable rigidity coefficient which is divided into a first deformed state and a second deformed state by a force threshold. When a force that the first arm assembly and the second arm assembly exert on the variable rigidity unit is smaller than the force threshold, the variable rigidity unit is in the first deformed state, and the variable rigidity coefficient is a first rigidity coefficient. When a force that the first arm assembly and the second arm assembly exert on the variable rigidity unit is larger than the force threshold, the variable rigidity unit is in the second deformed state, and the variable rigidity coefficient is a second rigidity coefficient. The second rigidity coefficient is larger than the first rigidity coefficient.

The body abuts the first joining units and the second joining units, such that multiple abutment portions are formed on the body or on the first joining units and the second joining units.

The at least one bearing is mounted around the shaft and located at a side of the variable rigidity unit facing the first arm assembly.

Other objectives, advantages and novel features of the present invention will become more apparent from the following detailed description when taken in conjunction with the accompanying drawings.

DETAILED DESCRIPTION OF PREFERRED EMBODIMENT

Figure 1:
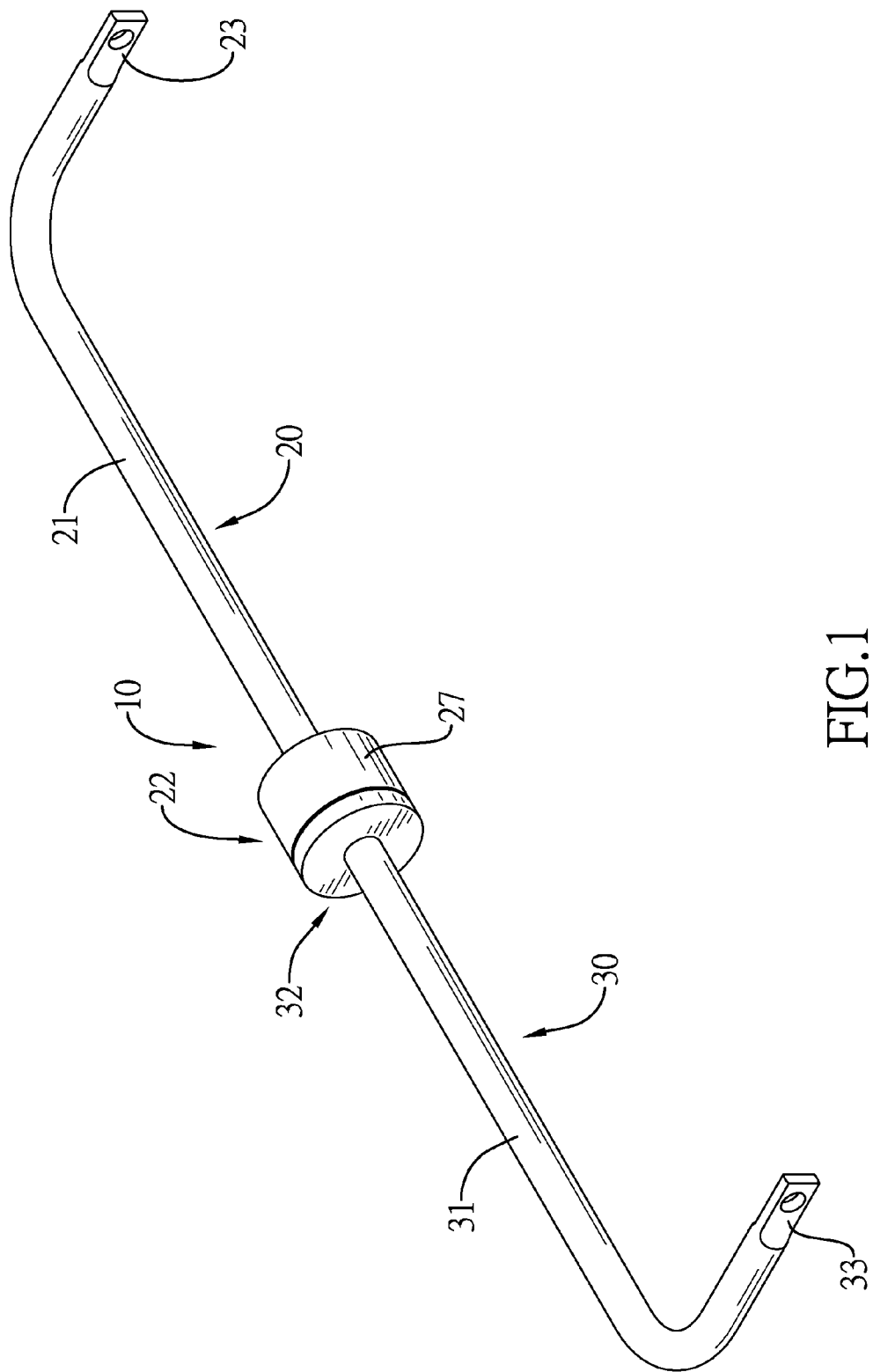
FIG. 1 is a perspective view of a first preferred embodiment of an anti-roll bar device with a variable rigidity in accordance with the present invention.
Figure 2:
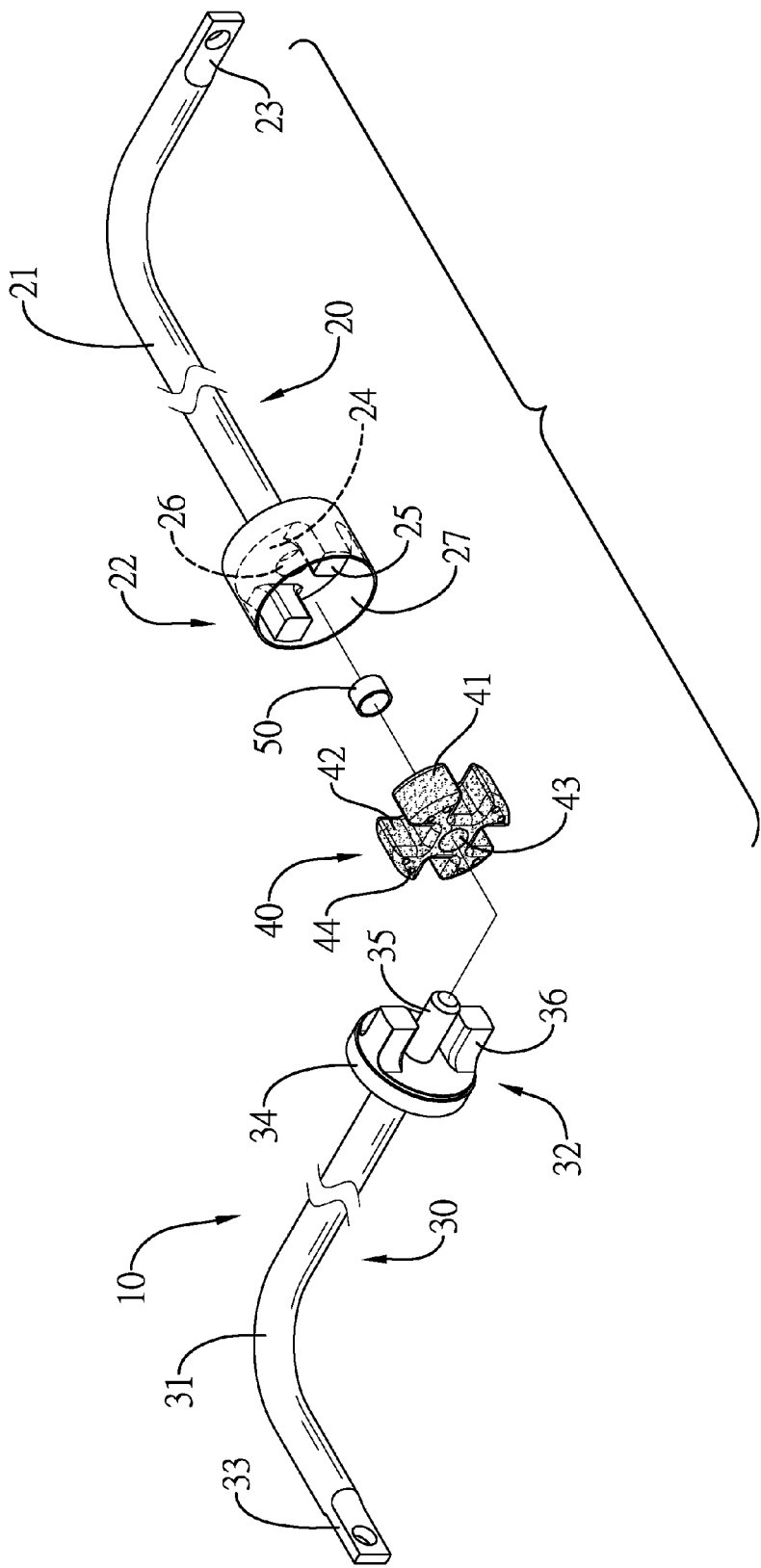
FIG. 2 is an exploded perspective view of the anti-roll bar device with a variable rigidity in FIG. 1.
Figure 4:
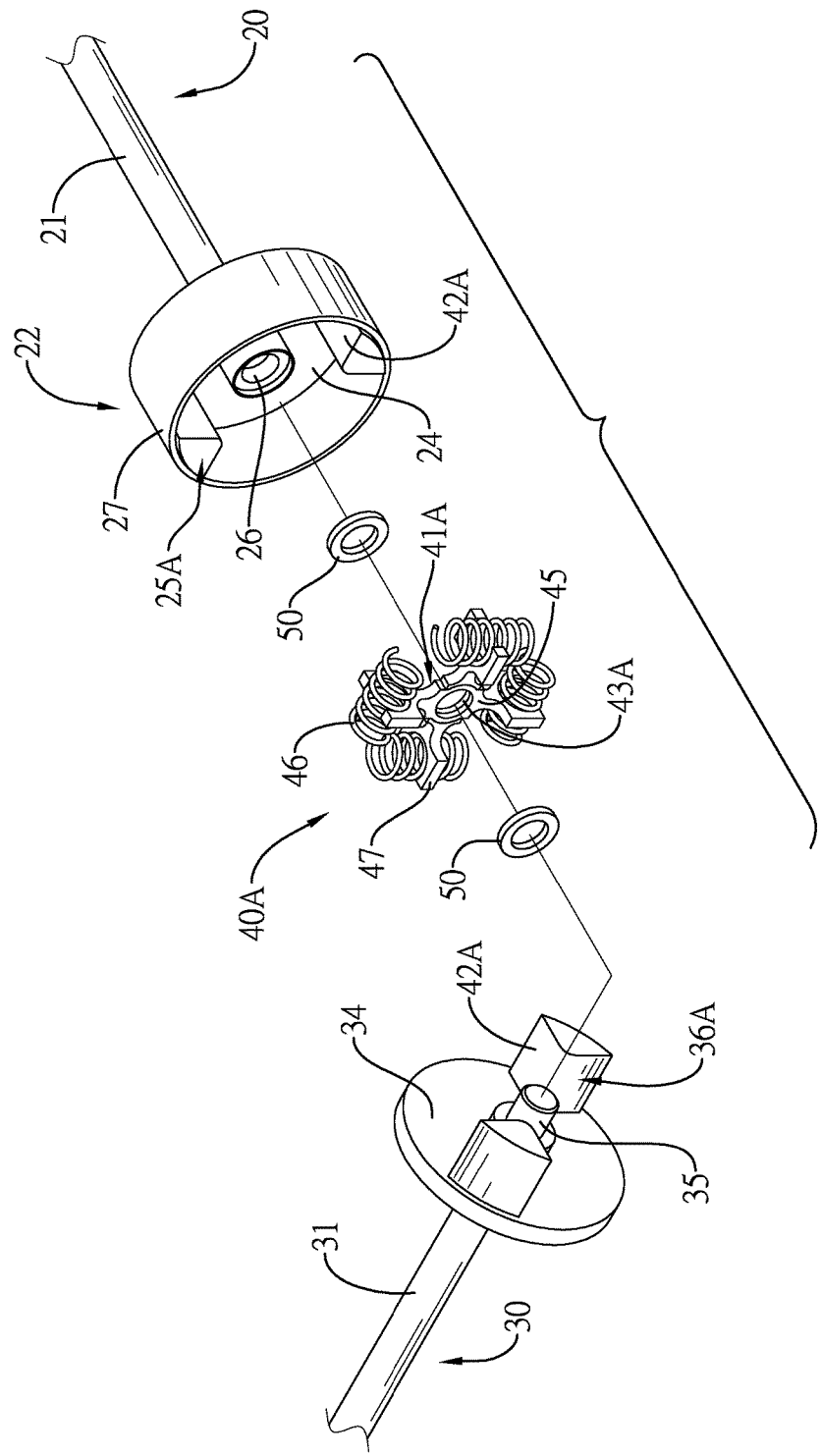
FIG. 4 is an exploded perspective view of a second preferred embodiment of an anti-roll bar device with a variable rigidity in accordance with the present invention.

With reference to FIGS. 1, 2, and 4, a first embodiment and a second preferred embodiment of an anti-roll bar device 10 with a variable rigidity in accordance with the present invention comprises a first arm assembly 20, a second arm assembly 30, a variable rigidity unit 40, 40A, and at least one bearing 50.

With reference to FIGS. 2 and 4, the first arm assembly 20 comprises a first bar 21 and a first joining module 22. The first bar 21 is bent and comprises a first connecting portion 23 formed on an end of the first bar 21. The first joining module 22 is mounted on an end of the first bar 21 at a position opposite the first connecting portion 23, and comprises a first base 24 and multiple first joining units 25, 25A. The first base 24 comprises a recess 26 recessed in a middle of the first base 24. The first joining units 25, 25A are mounted on a side of the first base 24 opposite the first bar 21, and are disposed around the recess 26.

With reference to FIGS. 2 to 5, the second arm assembly 30 comprises a second bar 31 and a second joining module 32. The second bar 31 is bent and comprises a second connecting portion 33 formed on an end of the second bar 31. The second joining module 32 is mounted on an end of the second bar 31 at a position opposite the second connecting portion 33, and comprises a second base 34, a shaft 35, and multiple second joining units 36, 36A. The shaft 35 is disposed on a side of the second base 34 opposite the second bar 31, and the shaft 35 is located at a middle of the second base 34. The shaft 35 corresponds to and is inserted into the recess 26. The second joining units 36, 36A are mounted on the side of the second base 34, and are disposed around the shaft 35. The second joining units 36, 36A and the first joining units 25, 25A are staggered with each other around the shaft 35 and the recess 26.

Figure 8:
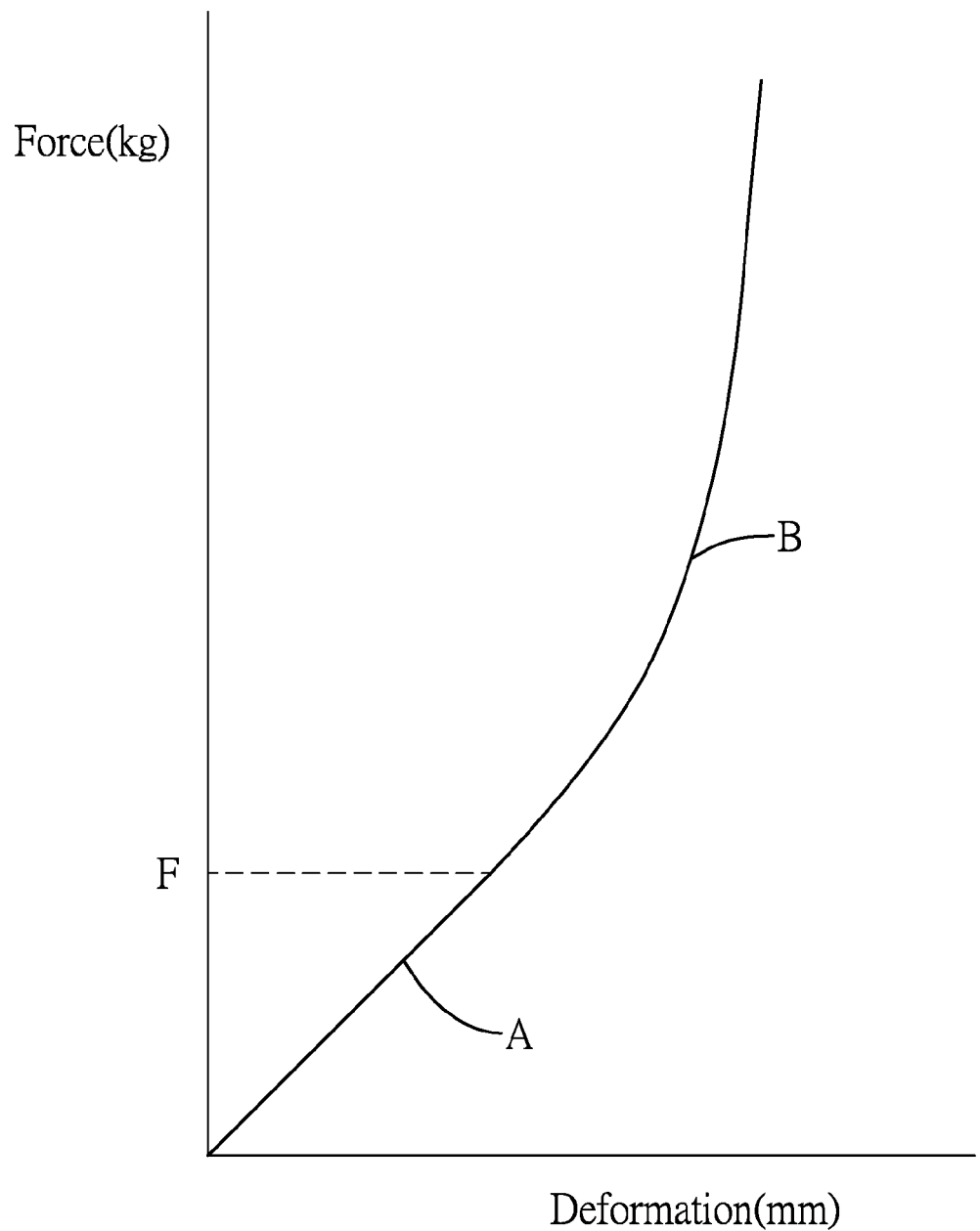
FIG. 8 is a curve diagram between force and deformation of the variable rigidity unit of the first preferred embodiment.
Figure 9:
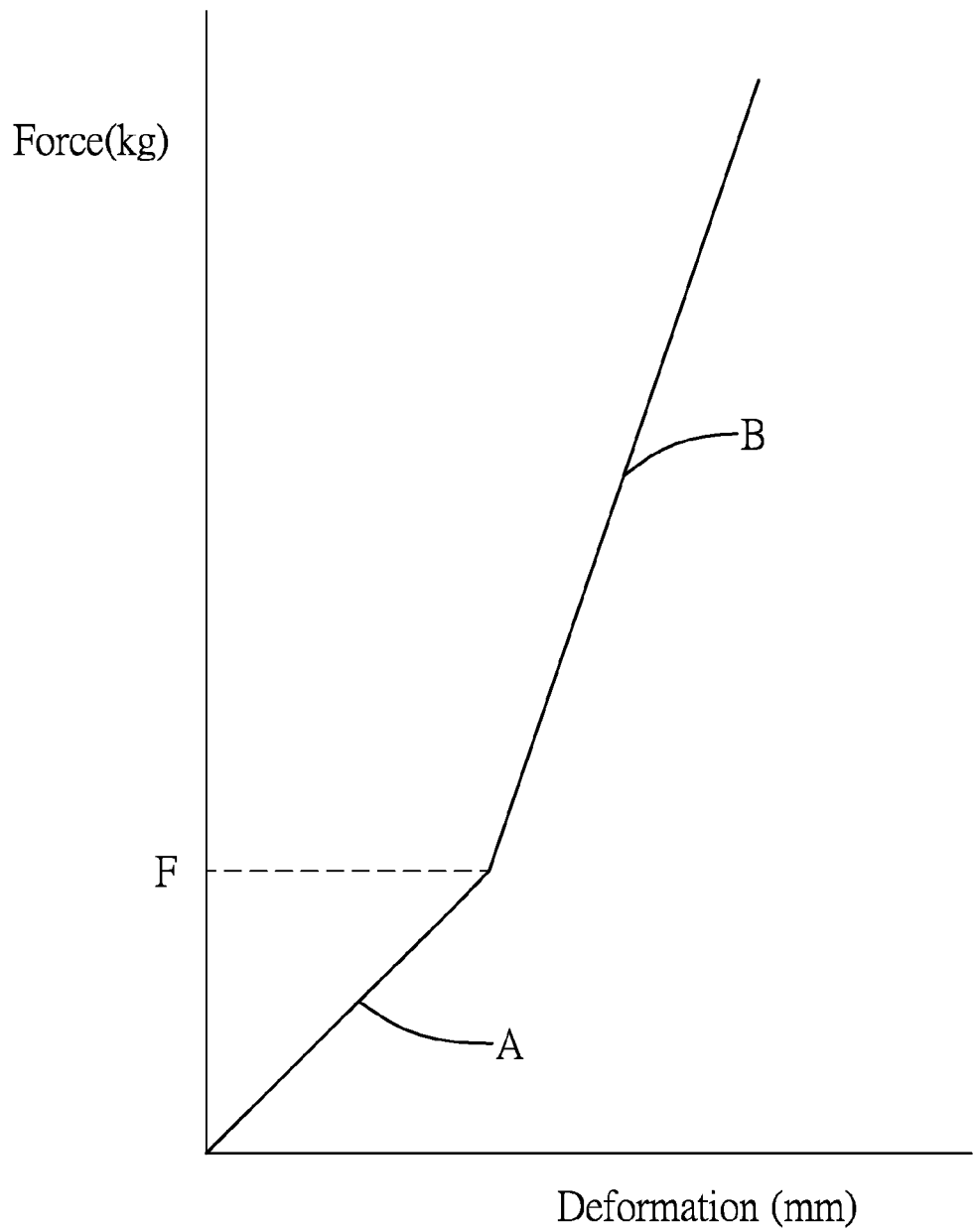
FIG. 9 is a curve diagram between force and deformation of the variable rigidity unit of the second preferred embodiment.

With reference to FIGS. 2 to 5, the variable rigidity unit 40, 40A is mounted between the first arm assembly 20 and the second arm assembly 30, and comprises a body 41, 41A. The body 41, 41A comprises a through hole 43, 43A formed through a middle of the body 41, 41A, and the shaft 35 is inserted through the through hole 43, 43A and into the recess 26. The first joining units 25, 25A and the second joining units 36, 36A are inserted through the body 41, 41A. Multiple abutment portions 42, 42A are formed on the body 41, 41A or on the first joining units 25, 25A and the second joining units 36, 36A. The variable rigidity unit 40, 40A has a variable rigidity coefficient. With reference to FIGS. 8 and 9, a deformed condition of the variable rigidity unit 40, 40A is divided into a first deformed state A and a second deformed state B by a force threshold F. When a force that the first arm assembly 20 and the second arm assembly 30 exert on the variable rigidity unit 40, 40A is smaller than the force threshold F, the variable rigidity unit 40, 40A is in the first deformed state A, and a ratio of the force to the deformation is a first rigidity coefficient. When a force that the first arm assembly 20 and the second arm assembly 30 exert on the variable rigidity unit 40, 40A is larger than the force threshold F, the variable rigidity unit 40, 40A is in the second deformed state B, and a ratio of the force to the deformation is a second rigidity coefficient. The second rigidity coefficient is larger than the first rigidity coefficient.

Figure 3:
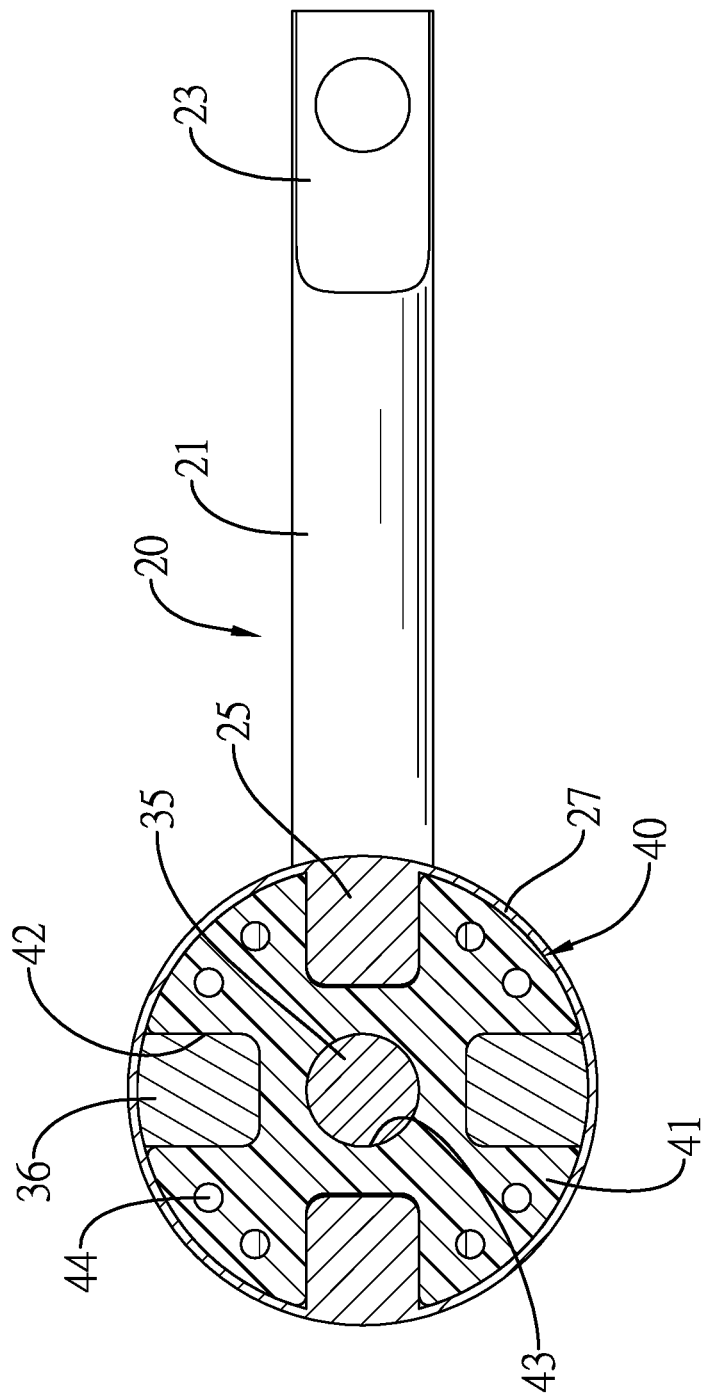
FIG. 3 is an enlarged cross sectional side view of the anti-roll bar device with a variable rigidity in FIG. 1.

The first preferred embodiment of the anti-roll bar device 10 with a variable rigidity is shown in FIGS. 2 and 3. The body 41 is made of Urethane. The body 41 is implemented as a block and has four wings. Two opposite sides of each wing are formed with two of the abutment portions 42, such that the abutment portions 42 are formed on the body 41 along a circumferential direction of the body 41. The body 41 further comprises multiple pores 44. The pores 44 are formed in the body 41, surround the through hole 43, and are adjacent to the abutment portions 42. The at least one bearing 50 is implemented as one bearing 50. The bearing 50 is mounted around the shaft 35 and mounted in the recess 26 to be disposed between the shaft 35 and the recess 26, and is located at a side of the variable rigidity unit 40 facing the first arm assembly 20.

Figure 5:
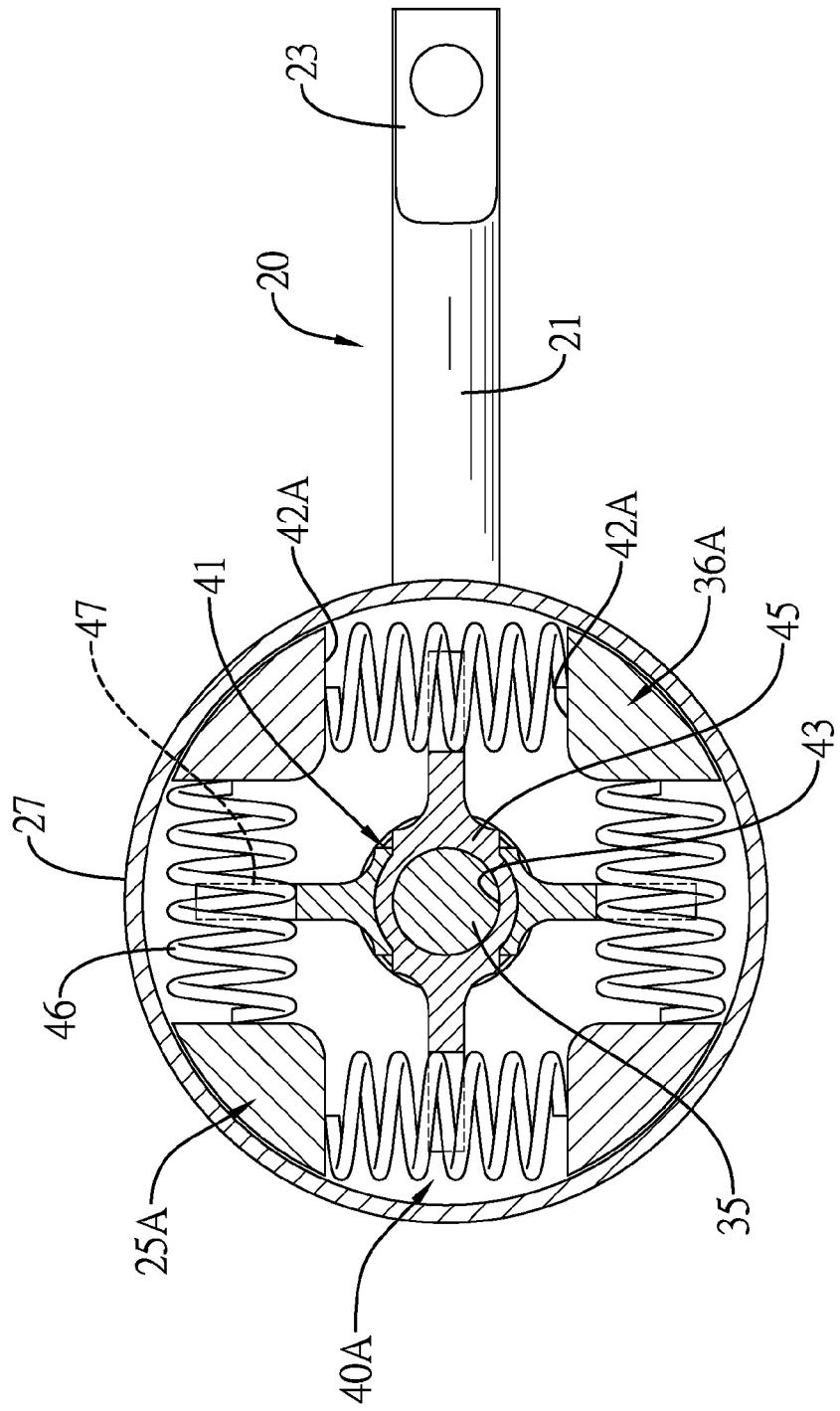
FIG. 5 is an enlarged cross sectional side view of the anti-roll bar device with a variable rigidity in FIG. 4.

The second preferred embodiment of the anti-roll bar device with a variable rigidity 10 is shown in FIGS. 4 and 5. The body 41A comprises a frame 45 and multiple springs 46. The through hole 43A is formed through a middle of the frame 45. The frame 45 comprises multiple fixtures 47 arranged to surround the through hole 43A at spaced intervals. Middles of the springs 46 are respectively mounted in the fixtures 47, and the springs 46 are arranged along a circumferential direction of the body 41A. The first joining units 25A and the second joining units 36A are staggered with each other. The abutment portions 42A are implemented on the first joining units 25A and the second joining units 36A to abut each two adjacent ends of the springs 46.

Furthermore, with reference to FIGS. 2 and 4, the first arm assembly 20 further comprises a casing 27 surrounding a periphery of the first base 24 and covering the first joining units 25, 25A, the variable rigidity unit 40, 40A, the second joining units 36, 36A, and the shaft 35.

Figure 6:
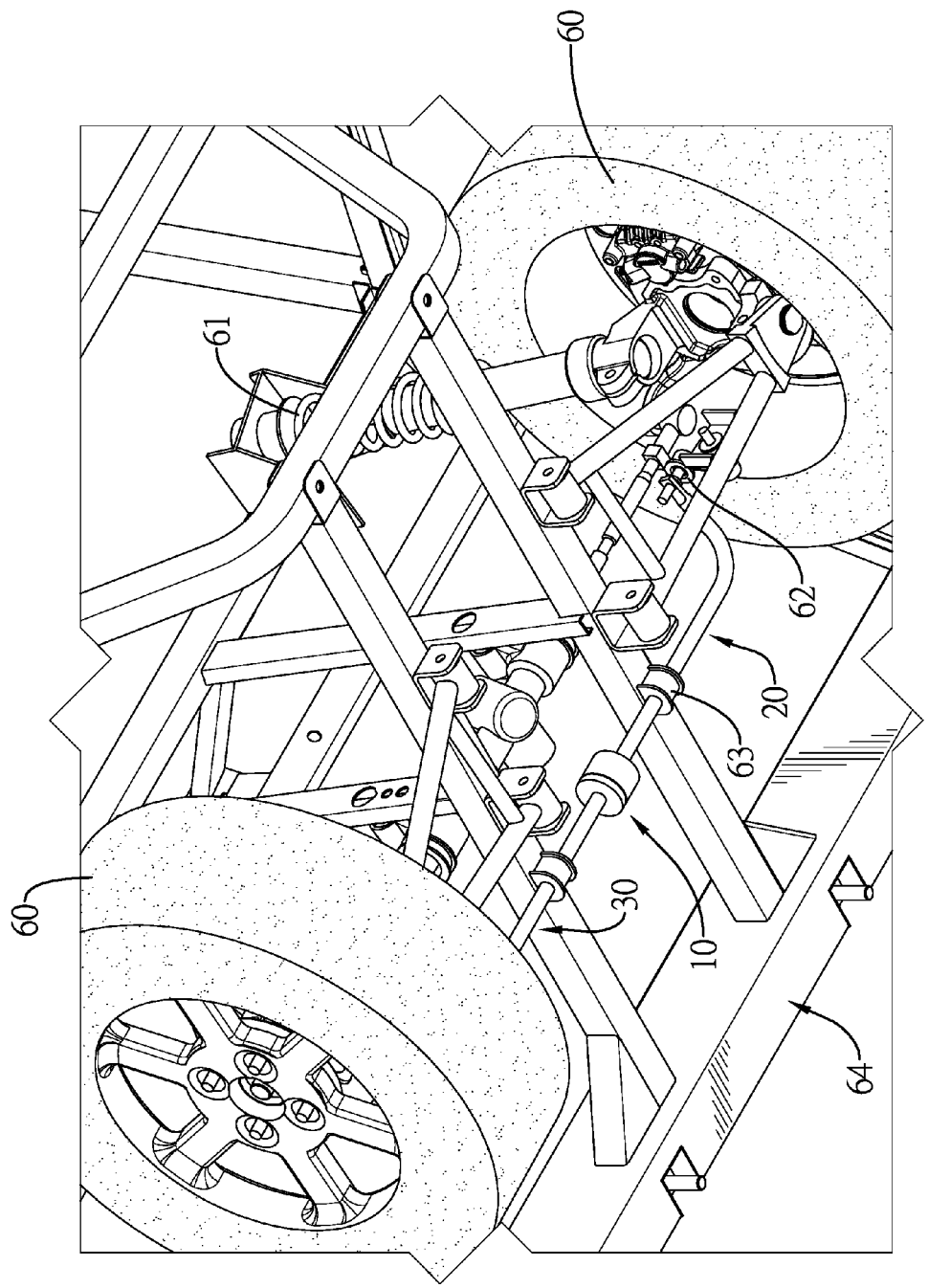
FIGS. 6 and 7 are operational perspective and side views of the anti-roll bar device with a variable rigidity.
Figure 7:
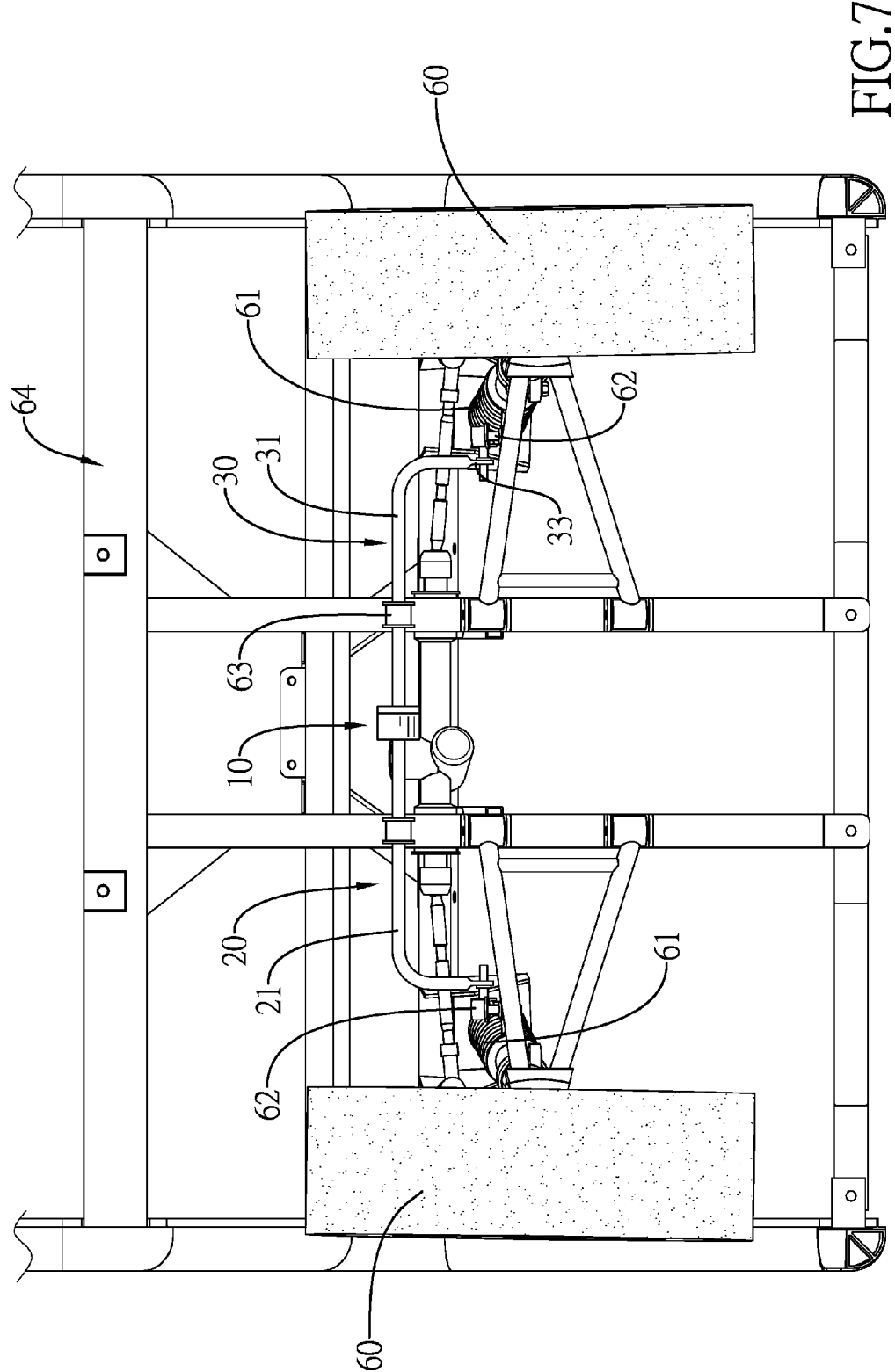

In use, with reference to FIGS. 6 and 7, the anti-roll bar device 10 with a variable rigidity is mounted between two suspension systems 61 of two wheels 60 on two sides of a vehicle. The first connecting portion 23 and the second connecting portion 33 are respectively connected with a universal unit 62, and are below bottoms of the suspension systems 61. Two fixing units 63 are respectively mounted around the first bar 21 and the second bar 31. The fixing units 63 are fixed on a vehicle body 64 of the vehicle, such that the anti-roll bar device 10 with a variable rigidity is fixed on the vehicle body 64 by the fixing units 63.

With reference to FIGS. 2, 4, 6, and 7, when a height difference is formed between the suspension systems 61 of the wheels 60, the first connecting portion 23 and the second connecting portion 33 are respectively forced by an upward force or a downward force to generate torques in different directions because the first arm assembly 20 and the second arm assembly 30 are bent. The torques in different directions will drive the first arm assembly 20 and the second arm assembly 30 to rotate in different directions, such that the first joining units 25, 25A and the second joining units 36, 36A will compress the variable rigidity unit 40, 40A.

With reference to FIGS. 2 and 8, when the variable rigidity unit 40 is forced by a force that is smaller than the force threshold F, the ratio of the force to the deformation varies linearly. In other words, the first rigidity coefficient of the variable rigidity unit 40 is a constant. When the force is larger than the force threshold F, the ratio of the force to the deformation varies nonlinearly. In other words, the second rigidity coefficient of the variable rigidity unit 40 is non-constant.

With reference to FIGS. 4 and 9, when the variable rigidity unit 40A is forced by a force that is smaller than the force threshold F, the ratio of the force to the deformation varies linearly. In other words, the first rigidity coefficient of the variable rigidity unit 40A is a constant. When the force is larger than the force threshold F, the ratio of the force to the deformation also varies linearly. In other words, the second rigidity coefficient of the variable rigidity unit 40A is also constant.

When the vehicle passes a bumpy terrain, a slight height difference is continuously formed between the two suspension systems 61 because of the bumpy road conditions, and the slight height difference will generate slight torques to the first arm assembly 20 and the second arm assembly 30. The first joining units 25, 25A and the second joining units 36, 36A will provide the variable rigidity unit 40, 40A with a slight force that is smaller than the force threshold F. The variable rigidity unit 40, 40A will be deformed to absorb the force, such that the vehicle can be kept from tilting or vertical vibration.

When the vehicle is in cornering, a centrifugal force will lead to a large height difference between the two suspension systems 61 to generate large torques respectively for the first arm assembly 20 and the second arm assembly 30. The first joining units 25, 25A and the second joining units 36, 36A will provide the variable rigidity unit 40, 40A with a large force that is larger than the force threshold F. Because the second rigidity coefficient is larger than the first rigidity coefficient, deformation of the variable rigidity unit 40, 40A will decrease substantially. The torques can be transferred from an end to the other end of the anti-roll bar device 10 with a variable rigidity to balance and offset the two torques respectively exerted on the first arm assembly 20 and the second arm assembly 30. Therefore, tilting caused by cornering of the vehicle can be avoided effectively.

With reference to FIGS. 2 and 3, the pores 44 of the body 41 provide an effect for the anti-roll bar device 10 with a variable rigidity to absorb the slight force to adjust the rigidity of the body 41.

With reference to FIGS. 2 and 4, the casing 27 can keep dust and moisture from entering the first joining module 22 and the second joining module 32 to protect the variable rigidity unit 40, 40A from erosion by the dust and the moisture and to prolong a useful life of the variable rigidity unit 40, 40A.

Therefore, when the variable rigidity unit 40, 40A is forced by the force which is smaller than the force threshold F, the variable rigidity unit 40, 40A will be deformed to absorb the force to prevent the tilting and vertical vibrations, such that motorists and passengers will not feel uncomfortable. Alternatively, when the variable rigidity unit 40, 40A is forced by the force that is larger than the force threshold F, the rigidity of the variable rigidity unit 40, 40A is increased, such that the variable rigidity unit 40, 40A will not be deformed easily, so as to transfer the torques effectively. When the vehicle is in cornering, the tilting can be avoided effectively.

From the above description, it is noted that the present invention has the following advantages:

1. When the vehicle passes the bumpy terrain, compression and extension will be continuously generated on the two suspension systems 61, so the first joining units 25, 25A, and the second joining units 36, 36A can compress the variable rigidity unit 40, 40A. The height difference between the suspension systems 61 is slight, so the variable rigidity unit 40, 40A is under the first deformed state to absorb the force. Therefore, the forces of the suspension systems 61 will not be transferred to each other, thereby avoiding the tilting and up-and-down shaking. The motorists and passengers will not feel uncomfortable.

2. Increment of deformation of the variable rigidity unit 40, 40A is decreased along with the force, so when the vehicle is in cornering, the large height difference is formed between the two suspension systems 61 to respectively give torques to the first arm assembly 20 and the second arm assembly 30 in different directions. Therefore, the first joining units 25, 25A and the second joining units 36, 36A can further compress the variable rigidity unit 40, 40A, such that the variable rigidity unit 40, 40A will be in the second deformed state B. When a difference between the compression and the extension of the two suspension systems 61 becomes larger, the increment of deformation of the variable rigidity unit 40, 40A becomes smaller to transfer the torques between the two ends of the anti-roll bar device 10 with a variable rigidity, such that the tilting of the vehicle can be avoided effectively.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An anti-roll bar device comprising:
   a first arm assembly comprising
      a first bar being bent, and comprising a first connecting portion formed on an end of the first bar; and
      a first joining module mounted on an end of the first bar at a position opposite the first connecting portion, and comprising
         a first base comprising a recess recessed in a middle of the first base; and
         multiple first joining units mounted on a side of the first base at a position opposite the first bar, and disposed on a periphery of the recess;
   a second arm assembly comprising
      a second bar being bent, and comprising a second connecting portion formed on an end of the second bar;
      a second joining module mounted on an end of the second bar at a position opposite the second connecting portion, and comprising
         a second base;
         a shaft disposed on a side of the second base at a position opposite the second bar, located at a middle of the second base, and corresponding to and inserted into the recess; and
         multiple second joining units mounted on the side of the second base and disposed on a periphery of the shaft, and the second joining units and the first joining units staggered with each other along the peripheries of the shaft and the recess;
   a variable rigidity unit mounted between the first arm assembly and the second arm assembly, and comprising a body comprising a through hole formed through a middle of the body, and the shaft inserted through the through hole, wherein the variable rigidity unit has a variable rigidity coefficient which is divided into a first deformed state and a second deformed state by a force threshold, wherein
      when a force that the first arm assembly and the second arm assembly exert on the variable rigidity unit is smaller than the force threshold, the variable rigidity unit is in the first deformed state, and the variable rigidity coefficient is a first rigidity coefficient;
      when a force that the first arm assembly and the second arm assembly exert on the variable rigidity unit is larger than the force threshold, the variable rigidity unit is in the second deformed state, and the variable rigidity coefficient is a second rigidity coefficient, and the second rigidity coefficient is larger than the first rigidity coefficient;

the body abuts the first joining units and the second joining units, such that multiple abutment portions are formed on the body, or on the first joining units and the second joining units; and at least one bearing is mounted around the shaft and is located at a side of the variable rigidity unit facing the first arm assembly.

2. The anti-roll bar device with a variable rigidity as claimed in claim 1, wherein the body is implemented as a block and is made of Urethane, and the abutment portions are formed on the body.

3. The anti-roll bar device with a variable rigidity as claimed in claim 2, wherein the body further comprises multiple pores formed in the body, surrounding the through hole, and being adjacent to the abutment portions.

4. The anti-roll bar device with a variable rigidity as claimed in claim 3, wherein the first arm assembly further comprises a casing surrounding a periphery of the first base and covering the first joining units, the variable rigidity unit, the second joining units, and the shaft.

5. The anti-roll bar device with a variable rigidity as claimed in claim 2, wherein the first rigidity coefficient of the variable rigidity unit is a constant, and the second rigidity coefficient of the variable rigidity unit is non-constant.

6. The anti-roll bar device with a variable rigidity as claimed in claim 5, wherein the first arm assembly further comprises a casing surrounding a periphery of the first base and covering the first joining units, the variable rigidity unit, the second joining units, and the shaft.

7. The anti-roll bar device with a variable rigidity as claimed in claim 2, wherein the first arm assembly further comprises a casing surrounding a periphery of the first base and covering the first joining units, the variable rigidity unit, the second joining units, and the shaft.

8. The anti-roll bar device with a variable rigidity as claimed in claim 1, wherein the body comprises
a frame, and the through hole formed through a middle of the frame, and the frame comprising multiple fixtures arranged to surround the through hole at spaced intervals; and
multiple springs, and middles of the springs respectively mounted in the fixtures; and
the abutment portions are implemented on the first joining units and the second joining units to abut each two adjacent ends of the springs.

9. The anti-roll bar device with a variable rigidity as claimed in claim 8, wherein the first rigidity coefficient of the variable rigidity unit is a constant, and the second rigidity coefficient of the variable rigidity unit is also a constant.

10. The anti-roll bar device with a variable rigidity as claimed in claim 9, wherein the first arm assembly further comprises a casing surrounding a periphery of the first base and covering the first joining units, the variable rigidity unit, the second joining units, and the shaft.

11. The anti-roll bar device with a variable rigidity as claimed in claim 8, wherein the first arm assembly further comprises a casing surrounding a periphery of the first base and covering the first joining units, the variable rigidity unit, the second joining units, and the shaft.

12. The anti-roll bar device with a variable rigidity as claimed in claim 1, wherein the first arm assembly further comprises a casing surrounding a periphery of the first base and covering the first joining units, the variable rigidity unit, the second joining units, and the shaft.

* * * * *